March 19, 1935.  D. B. KNIGHT  1,994,475
ABSORPTION REFRIGERATION SYSTEM
Filed May 5, 1931
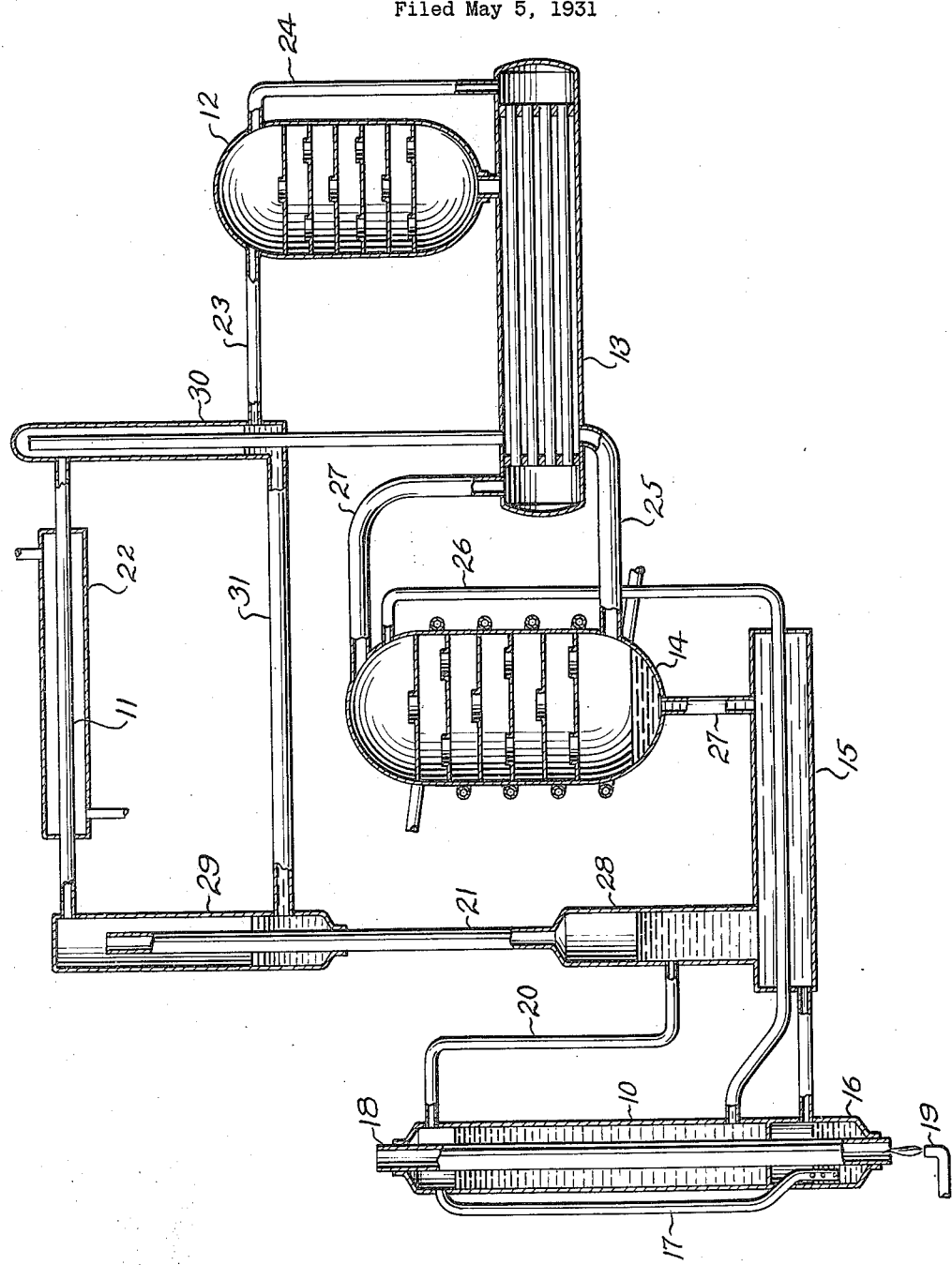
INVENTOR.
D. B. KNIGHT
BY
ATTORNEY

UNITED STATES PATENT OFFICE 1,994,475

ABSORPTION REFRIGERATION SYSTEM

Donald B. Knight, Brooklyn, N. Y., assignor, by mesne assignments, to Electrolux Servel Corporation, New York, N. Y., a corporation of Delaware Application May 5, 1931, Serial No. 535,102

6 Claims. (Cl. 62—119.5)

This invention relates to absorption refrigerating apparatus and more specifically to a combination of elements including an analyzer for use with such apparatus.

In order to minimize heat losses in absorption refrigerating systems it is desirable to eliminate absorption liquid vapor from the refrigerant vapor passing from the generator to the condenser. This may be effected by passing the gas in contact with enriched absorption liquid flowing from the absorber to the generator. Heretofore this has been accomplished by pumping the enriched absorption liquid from the absorber to a lever above the liquid in the generator and allowing it to flow to the generator by gravity. A distinct disadvantage of this arrangement is the necessary height of apparatus with its attending difficulties, especially with a thermo-syphon or vapor lift type pump.

An object of this invention is to provide a simple means of analyzing the generated vapors. This is accomplished by bubbling them through the enriched absorption liquid flowing from the absorber to the generator.

Another object is to provide an analyzer of such design and disposition in the system that the pumping height is not increased relative to the pumping height in the same system without an analyzer or with an analyzer in accordance with the prior art.

Other objects and advantages will be apparent from the following description taken in connection with the accompanying drawing which shows an analyzer contemplated by this invention applied to an absorption refrigerating apparatus of the pressure equalized type as disclosed in Patent 1,609,334 to von Platen et al.

Referring to the drawing, the apparatus comprises the usual parts including a generator 10, rectifier 29, condenser 11, evaporator 12, gas heat exchanger 13, absorber 14, and liquid heat exchanger 15. Below the generator 10 is a pump vessel 16 from which a pump pipe or percolator tube 17 discharges into the upper end of the generator. Both the generator and the pump vessel are heated by a flue 18 over a burner 19.

The generator contains a solution of refrigerant in an absorption liquid and, when heated, the refrigerant is expelled from solution as a gas and passes through conduits 20 and 21 and rectifier 29 to the condenser 11 where it is cooled and liquefied by the transfer of heat to cooling water flowing through the condenser cooling jacket 22. Liquid refrigerant accumulates in the lower part of the reservoir 30 and rectifier 29 which are connected by conduit 31, and overflows through conduit 23 into the upper part of the evaporator 12 where it evaporates, absorbing heat from the surrounding medium, and diffuses into an inert pressure equalizing gas such as hydrogen which enters the evaporator through conduit 24. The resulting gas mixture passes from the bottom of the evaporator into the gas heat exchanger 13 from which it flows into the absorber 14 through conduit 25.

Weak absorption liquid passes from the generator 10 through the liquid heat exchanger 15 and enters the absorber 14 through conduit 26, flowing downwardly over the baffle plates and absorbing the refrigerant gas. The enriched absorption liquid accumulates in the lower part of the absorber and flows through conduit 27 and liquid heat exchanger 15 to the pump vessel 16 from which it is lifted by thermo-syphon action through pump pipe 17 back to the generator.

The inert gas passes from the top of the absorber 14 through conduit 27 and the gas heat exchanger 13 back to the evaporator through conduit 24.

According to this invention, an analyzer comprising a vessel 28 is connected to the enriched absorption liquid circuit between the absorber and the pump chamber as, for instance, by mounting on the liquid heat exchanger 15 as shown. The enriched absorption liquid stands in this vessel at the same lever as the liquid in the absorber. The upper part of the analyzer is connected to the condenser through conduit 21, and conduit 20 which conducts vapors expelled from solution in the generator is connected to the analyzer somewhat below the normal liquid level therein. The generator vapors bubble through the enriched absorption liquid standing in the analyzer, whereby absorption liquid vapor is removed from the refrigerant due to the cooling effect of the absorption liquid, and additional refrigerant is vaporized due to the heating of the absorption liquid by the gas derived from the generator.

Due to the weight of liquid above the connection of pipe 20 to the analyzer 28 there is a depression of the liquid level in the generator and a resistance in the pump pipe 17 is produced. In short, the pumping head is increased but, since the level in the generator is depressed, the discharge of the pump pipe into the generator may be lower so that the pumping lift is the same as if the analyzer were not used, the only difference being that the generator and pump vessel are lowered to allow for the greater pumping head, that is the distance between the liquid level in the absorber and the hole in the pump pipe.

It will be obvious to those skilled in the art that various changes may be made in the construction and arrangement without departing from the spirit of the invention and therefore the invention is not limited to what is shown in the drawing and described in the specification but only as indicated in the following claims.

I claim:

1. In an absorption refrigerating system of the pressure equalized type, thermosyphonic means for raising absorption liquid from the absorber into the generator, and an analyzing vessel connected in the system to contain enriched absorption liquid to the level of liquid in the absorber, said vessel being connected above the liquid level to the condenser and below the liquid level to the vapor space in the generator.

2. In an absorption refrigeration system of the pressure equalized type including a generator and absorber, thermosyphonic means for raising absorption solution from the absorber into the generator, and an analyzing vessel connected in the system to contain enriched absorption solution substantially to the level of liquid in the absorber, said vessel being connected below the liquid level to receive vapors from said generator.

3. In an absorption refrigeration system of the pressure equalized type including a generator, thermosyphonic means for raising absorption solution from a lower level to a higher level in said generator, and an analyzing vessel connected in the system to contain absorption solution to said lower level, said vessel being connected below said liquid level to receive vapors from said generator.

4. In an absorption refrigeration system of the pressure equalized type including a generator, thermosyphonic means for raising absorption solution into said generator from a lower level, and connections for flow of vapors from said generator by bubbling through enriched absorption solution at said lower level thereby maintaining a liquid head pressure in the generator and effecting analyzation of the vapor.

5. In an absorption refrigeration system, an absorber, a first heating zone, a second heating zone, members for circulation of absorption liquid from said absorber through said heating zones in series respectively, said members and said first heating zone cooperating to cause said circulation due to vapor lift action, and means to conduct vapor from said second heating zone and bubble said vapor through absorption liquid below the level of said absorption liquid in its path of flow between said absorber and said first heating zone and below the level of liquid in said absorber.

6. In an absorption refrigeration system, a first externally heated zone, a second externally heated zone at a higher level than said first zone, an externally cooled zone, members for circulation of solution from said cooled zone through said externally heated zones in series respectively, said members and said first externally heated zone cooperating to cause said circulation of solution, and means for conducting vapor from said second externally heated zone through the circulating solution beneath the liquid level thereof to produce an internally heated zone, and means for conducting vapor from last said zone through a condensation-evaporation cycle to said externally cooled zone.

DONALD B. KNIGHT.